Oct. 23, 1956  J. J. ANDERSON, JR  2,767,916
VOLUME INDICATING DEVICE
Filed Feb. 19, 1953  2 Sheets-Sheet 1

INVENTOR:
JOHN J. ANDERSON, JR.
BY
ATT'YS

Oct. 23, 1956    J. J. ANDERSON, JR    2,767,916
VOLUME INDICATING DEVICE
Filed Feb. 19, 1953    2 Sheets-Sheet 2
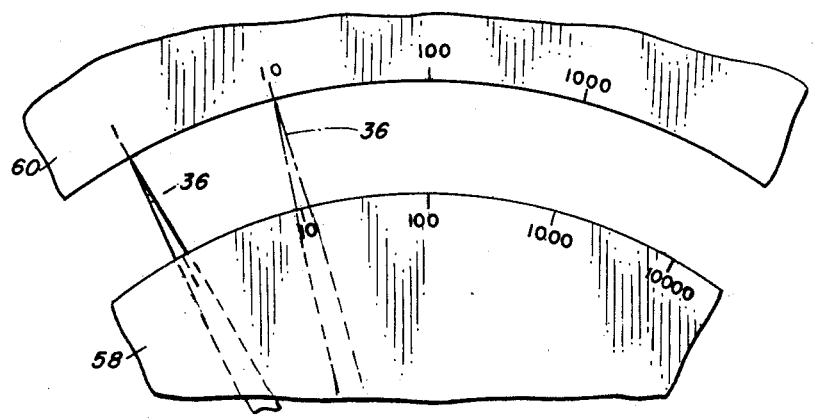
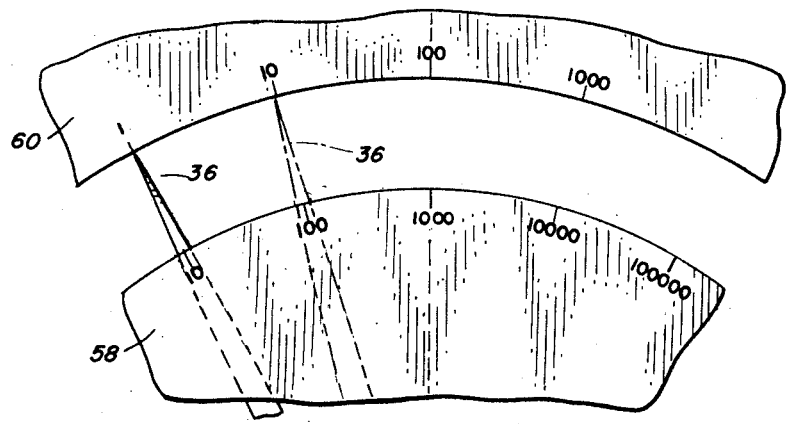
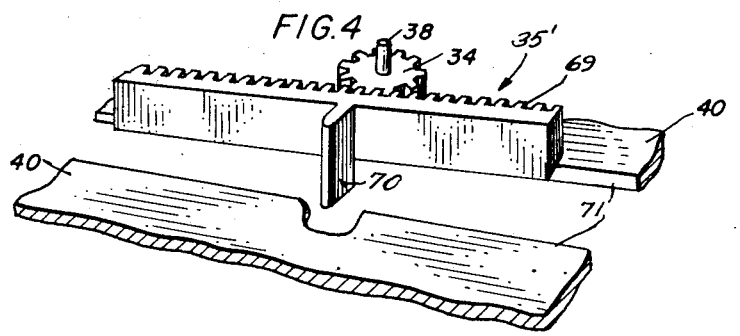
INVENTOR:
JOHN J. ANDERSON, JR.
BY
ATT'YS

United States Patent Office 2,767,916
Patented Oct. 23, 1956

2,767,916
VOLUME INDICATING DEVICE
John Joseph Anderson, Jr., Norfolk, Va.

Application February 19, 1953, Serial No. 337,896

17 Claims. (Cl. 235—61)

(Granted under Title 35, U. S. Code (1952), sec. 266)

This invention relates to dimension-measuring devices; more particularly, the invention relates to a volume-indicating device adapted to be rolled over the three dimensions of a rectangular solid to automatically indicate each dimension separately measured and also the product of the three dimensions which would be the volume of the article measured.

There are numerous occasions requiring that the volume of a package be determined in order that the evaluation of available space for storing and transporting the items may be obtained. A common method of measuring the volume of packages is merely to measure with a tape the various dimensions of the item and then multiply the given dimensions. Slide rules or like devices could be used to multiply the various dimensions which were measured. These methods, however, are relatively very time consuming and require the aid of a person who is either able to multiply by hand or to use the particular instrument involved.

One object of the invention is to provide a dimension-indicating device which does not require a skilled operator to utilize it.

A further object of the invention is to provide a computing device which automatically indicates each linear dimension of a package over which the instrument rolls and also determines the volume thereof.

A still further object of the invention is to provide a novel and improved cargo volume-indicating device which is of simple and economical construction and which is easy to operate.

Another object of the invention is to provide a novel dimension-indicating device capable of automatically indicating separately either the first, second, or third dimension of a given rectangular solid.

A feature of the invention is in providing a cargo volume-indicating device having a rollable contact wheel adapted to be rolled over a surface to be measured, a movable logarithmic scale, a stationary logarithmic scale adjacent said movable scale, a movable index marker overlying the stationary and movable scales, a means coupling the motion from the rollable contact wheel to the movable scale and index marker, the latter coupling means including a unidirectional coupling means for causing the movable scale to move in only one direction progressively following motion of the rollable contact. Further, a means is provided for automatically returning the index marker to zero reference position when the rollable contact wheel is raised from the surface to be measured.

Other features and objects of the invention will become more apparent upon making reference to the specification, claims, and drawings wherein:

Fig. 4 is a perspective view of the rack and gear apparatus shown in Fig. 3; and Figs. 5a and 5b show different relative positions of the scales and pointer used with the embodiments of Figs. 1 and 3.

Figure 1:
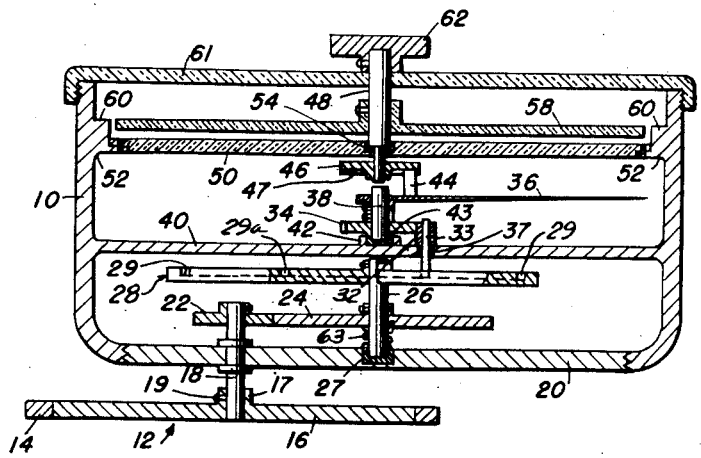
Fig. 1 is a cross-sectional view of one embodiment of the invention and is taken as indicated by the line 1—1 in Fig. 2.

The device shown in Fig. 1 indicates a casing 10 having a circular cross section housing the instruments for indicating the dimensions to be measured. A wheel 12 is connected to the outer end of a shaft 18 which extends through an opening in the bottom of the casing 10, and the wheel includes a friction rim 14 connected to a hub portion 16 for engagement with the surface to be measured. The hub portion 16 has a collar 17 which by means of a screw 19 is attached to the shaft 18. The bottom of the casing 10 has a removable plate member 20 which may be screwed into the bottom of the casing so that access may be had to the inside thereof.

The function of the mechanism within the casing 10 is, first of all, to give an indication of each linear dimension traversed by the outer periphery of the wheel 12 and to multiply such dimensions together in order to indicate the area or volume of a given rectangular solid over which the wheel 12 is rolled.

Figure 2:
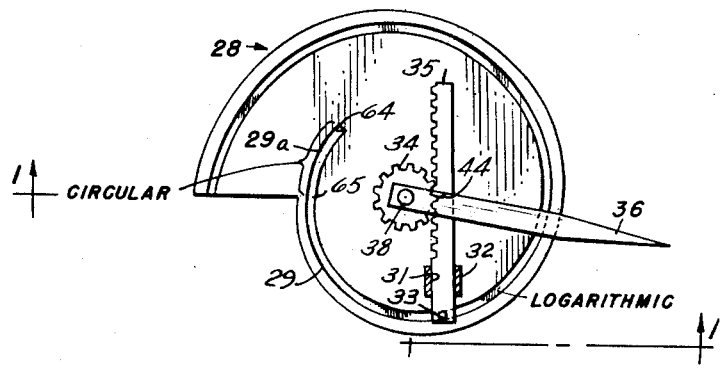
Fig. 2 is a schematic top plan view of a part of the mechanism shown in Fig. 1, a partition between portions of the mechanism being omitted.

Fixed to the end of the shaft 18 is a gear 22 which meshes with a gear 24 fixedly connected to a shaft 26 within the casing 10. The shaft 26 is journaled in a bearing 27 located in an opening in the bottom of the plate member 20 of the casing 10. At the opposite end of the shaft 26 is a cam plate 28 which rotates with the movement of gears 24 and 22. The cam plate 28 includes a slot 29 extending about the periphery thereof as shown in Fig. 2. A follower arm 33 projects from a rack 35 having gear teeth at one edge thereof and rides in the slot 29 of the cam plate 28, and the rack extends between the walls of a slot 31 in a guide member 32 to hold it in place. The arm 33 also projects through a slot 37 in a central partition 40 of the casing. As the cam plate 28 is rotated, the end of the cam follower arm 33 riding in slot 29 of the cam plate 28 is moved rectilinearly in one direction or the other in the slot 37 in the central partition 40. The distance of the slot 29 of cam plate 28 from the axis of rotation of the cam plate 28 is varied to follow a logarithmic function so that the motion of the cam follower arm 33 will also follow a logarithmic function. There is also a circular slot portion 29a at the beginning of the logarithmic slot 29, the axes of said slot portion being said axis of rotation.

The rectilinear motion of the cam follower 33 is converted into rotational motion of a gear 34 with which the cam follower rack 35 meshes. The gear 34 transmits movement to a pointer 36 which is fixedly connected to the same shaft 38 as the gear 34. Since the circular slot portion 29a extends around the shaft 38 as an axis, there is no movement of the rack 35 nor of the pointer 36 when the follower arm 33 traverses this slot portion.

The central partition 40 includes a flange portion 42 housing a bearing 43 in which the shaft 38 is journaled.

From the portion of the apparatus thus far described, it is apparent that the linear travel of the periphery of wheel 12 is accompanied by motion of the pointer 36 when the arm 33 follows the logarithmic slot 29, and that such motion is a logarithmic function of such travel.

Attached to the pointer 36 near the base thereof is a pawl arm 44 which engages a ratchet plate member 46 having suitably shaped ratchet teeth 47 on the bottom surface thereof which mesh with the pawl arm 44. The ratchet plate member 46 is connected to a shaft 48 extending through an upper casing partition plate 50. This partition plate 50 is preferably transparent and removably connected to a flange 52 extending inwardly from the casing 10 in order that access may be had to the inner top portion of the casing 10. The partition plate 50 supports a bearing 54 to receive the shaft 48, and the ratchet plate member 46 is connected to a reduced end portion of the shaft 48 which extends below the partition plate 50. Also connected to the shaft 48 is a transparent rotatable scale member 58, portions of which are also shown in Figs. 5a and 5b. The ratchet member 46 is arranged to be moved by the pawl arm 44 in one direction of rotation only of the pointer 36 for reasons which will hereinafter become apparent.

Surrounding the rotatable scale member 58 is an annular shoulder 60 extending from the side of the casing 10. On the exposed adjacent surfaces of the annular shoulder 60 and the rotatable scale member 58 are respectively numbered index marks spaced in logarithmic fashion as shown in Figs. 5a and 5b.

A circular transparent cover plate 61 screws onto the top of the casing 10. The shaft 48 extends through an opening in the cover plate 61, and a knob 62 is fixedly connected thereto. This knob 62 is rotatable to position the rotatable scale member 58 to its zero reference position just before the instrument is to measure the dimensions of a particular package.

A coil spring 63 anchored at one end to the plate 20 and at the other end to the gear 24 is stressed in response to roll of the wheel 12 along an edge or surface of a parallelepiped or other object to be measured and constantly exerts a bias operating to hold the closed end 64 of the arcuate slot portion 29a in abutment with the cam follower 33 when the wheel is free.

When the wheel 12 is free and the device is set for the first roll of the wheel, so that the follower 33 is in contact with the closed end 64 of the circular slot portion 29a, the relative positions of the fixed scale 60, the movable scale 58, and the pointer 36 are as shown in full lines in Fig. 5a, where it will be noted that the movable scale and pointer are in their respective positions of origin, with the pointer at the mark 1 of each scale.

Obviously the principle is the same regardless of the measurement units employed. Let it be assumed that the device illustrated is designed for measurement in inches, and, for simplicity of demonstration, that the volume of a 10" cube is to be determined. With the device set as just noted, the wheel 12 is rolled the full length of an edge of the cube. The length of the circular slot portion 29a (or, otherwise stated, the angle subtended by said slot portion) is made such that when the wheel 12 has traversed the first inch, the cam plate 28 has traveled through that angle so that, although there has been no motion of the pointer 36, the follower 33 is at the inner end 65 of the logarithmic slot 29. It is therefore apparent that the initial relation between the pointer 36 and the scales 58 and 60 is meaningless from a measurement standpoint, but when the wheel 12 has reached the end of the first inch of the roll, the position of the pointer has meaning since in pointing to the mark 1 on the stationary scale 58 the pointer then signifies the completion of the first inch of the wheel travel.

Continued roll of the wheel 12 along the first edge causes concurrent camming of the follower 33 along a rectilinear path whose length increases with the logarithm of the distance (after the first inch) traversed along said first edge by the wheel. The parts are so designed that when the wheel 12 reaches the other end of said edge and has thus traveled a total of 10", the pointer 36 is at the mark 10 of both scales 58 and 60 and thus indicates (in inches) the length of the first edge while the wheel 12 is still in contact with the other end of said edge. The arrangement of the ratchet teeth 47 is such that during the foregoing movement of the pointer 36 the pawl 44 slips over the ramps of said teeth so that the movable scale 58 remains stationary. It will be noted that clearance is afforded between the ratchet plate 46 and the transparent plate 50, and between the disc 58 and the cap 61, to allow for such slippage. Now upon the lifting of the device from the body being measured, the spring 63 returns the cam plate 28 to its initial position and thus the pointer resumes its position of origin at the mark 1 on the fixed scale 60, with the cam follower 33 again abutting the slot portion end 64. However, due to the fact that in this direction of movement the pawl 44 drives the ratchet plate 46, the scale 58 moves with the pointer 36, so that the mark 10 on said scale comes to rest opposite the mark 1 on the fixed scale 60, as shown in Fig. 5b, thus giving an indication (in inches) of the length of the first edge notwithstanding the fact that the wheel 12 is out of contact with the cube.

The foregoing cycle is repeated, with the wheel 12 traversing the second edge of the body being measured, so that, when that traverse is completed and the device is free of the body, the pointer 36 and the mark 100 on the movable scale 58 are at the mark 1 on the fixed scale 60, showing the area defined by the first two edges to be 100 square inches.

The cycle is again repeated, with the wheel 12 traversing the third edge of the body, so that, when that traverse is completed and the device is free, the pointer 36 and the mark 1000 on the movable scale 58 are at the mark 1 on the fixed scale 60, showing the volume of the body to be 1000 cubic inches.

Thus by logarithmic addition the volume, i. e., the product of the three dimensions, of the body is obtained. Due to the spring return, the successive rolls can be accomplished with negligible loss of time from roll to roll, so that the result is obtained expeditiously.

In practice, logarithmic graduations between the successive marks shown may be included in the scales so that intervening measurements may be observed on the device with minimum uncertainty of interpolation. Thus the device may be employed with equal facility with cubes other than a 10" cube, and with other parallelepipeds. For example, using a parallelepiped measuring 3" x 4" x 9", the cumulative movements of the scale 58 will bring a mark on that scale representing the product of those dimensions, i. e., 108, opposite the mark 1 on the fixed scale 60.

To prepare the device for measuring the volume of the next rectangle or parallelepiped, all that is necessary is that the movable scale 58 be returned to its original position. This is done by the simple expedient of pulling on the knob 62 until the ratchet teeth 47 clear the pawl 44; then, while the ratchet teeth are clear, turning the knob until the mark 1 on the movable scale 58 is opposite the mark 1 on the fixed scale 60; and finally, returning the knob to again mesh the ratchet teeth with the pawl in the original arrangement.

It is of course obvious that the device is also useful for measuring the length of any line, whether rectilinear or not, and the area of any rectangle.

Figure 3:
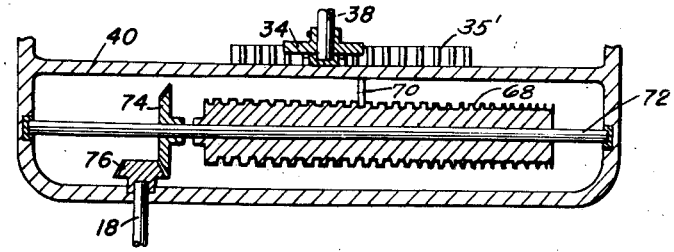
Fig. 3 is a schematic sectional view of an alternative embodiment of a portion of the invention.

A modification of the apparatus of Figs. 1 and 2 is shown in Figs. 3 and 4. The main difference between these embodiments resides in the manner in which the logarithmic motion of the pointer 36 is obtained from the motion of the wheel 12. Instead of utilizing a cam plate 28 as in Figs. 1 and 2, a helical cam or worm 68 is used in which the spacing of the threads follows a logarithmic function over a region corresponding to slot portion 29 in Fig. 2. A follower arm rack 35' having teeth 69 as shown meshes with the gear 34 in the same manner as the follower arm rack 35 in Figs. 1 and 2. A follower 70 extends from the rack 35' through a slot 71 in the partition member 40 and meshes with the worm 68 and moves parallel to the worm axis as the worm is rotated, moving the rack in accordance with a logarithmic function of the amount of rotation of the worm. The worm 68 is fixed to a shaft 72 to which a bevel gear 74 is also fixed. Connected to the shaft 18 of the wheel 12 is a bevel gear 76 which meshes with the bevel gear 74. In this embodiment, the rack 35' causes rotation of the gear 34 to move the pointer 36 in the same manner as described in connection with Figs. 1 and 2, and means (not shown) is employed to automatically effect return motion when the wheel is raised from the object being measured.

Many modifications may be made of the specific preferred embodiments above described without deviating from the broader, more generic aspects of the invention.

The invention described herein may be manufactured and used by or for the Government of the United States of America for Governmental purposes without payment of any royalties thereon or therefor.

I claim:

1. A cargo volume-indicating device comprising a rollable contact device adapted to be rolled over a surface to be measured, a movable logarithmic scale, a stationary logarithmic scale mounted adjacent said movable scale, a movable index marker adjacent said stationary and movable scales, means coupling motion from said rollable contact device to said movable scale and index marker, said coupling means adapted to convert linear motion of said contact device to logarithmic motion of said movable scale and index marker, said coupling means including a unidirectional coupling for causing said movable scale to move in only one direction progressively following motion of said rollable contact device, and a means for returning said index marker to an initial reference position when the rollable contact device is raised from the surface to be measured.

2. A cargo volume-indicating device comprising a rollable contact device adapted to be rolled over a surface to be measured, a dimension-indicating member having progressively increasing number divisions thereon spaced in accordance to a logarithmic function, an index-marker member adjacent the numbered divisions of said dimension-indicating member, coupling means for moving said index-marker member and dimension-indicating member relative to one another in degree proportional to the logarithm of the circumferential motion of said rollable contact device, said coupling means adapted to maintain the new position of said dimension-indicating member relative to said index-marker member after rolling of said rollable contact device over a linear dimension of an object to be measured whereby the product of successive dimensions may be obtained by logarithmic addition, said index marker member being a movable indicating device responsive to the rolling motion of said rollable contact device to indicate separately the linear dimension traversed by the rollable contact device and said coupling means including means for automatically returning said indicating device to an initial reference position when said rollable contact device is raised from the object to be measured.

3. A cargo volume-indicating device comprising a rollable contact adapted to be rolled over a surface to be measured, a fixed dimension-indicating logarithmic scale, a movable dimension-indicating logarithmic scale, a movable indicator cooperating with said scales, means for moving said indicator logarithmically in response to roll of said contact, means for returning said indicator to a predetermined starting position after said contact is removed from the surface of the object to be measured, so that the different dimensions of an object may be separately indicated by said indicator and said fixed scale, and means responsive to motion in one direction of rotation of said contact for cumulatively moving said movable scale for each corresponding dimensional movement in said direction of said contact, said responsive means being adapted to maintain the new position of said movable scale relative to said indicator after said contact has been removed from the measured surface, whereby the product of the previously measured dimensions will be indicated by said indicator and said movable scale.

4. The structure of claim 1, and means mounting said movable scale and index marker for rotary movement, said unidirectional coupling being a ratchet mechanism, and said returning means comprising a spring coupled to said index marker.

5. The structure of claim 3, said indicator and said movable scale being mounted for rotary movement.

6. A cargo volume-indicating device comprising a rollable contact adapted to be rolled over a surface of an object to be measured, a pair of scales having identical numbered divisions thereon arranged in logarithmic progression, one of said scales being movable, an indicator cooperating with said scales, means for causing relative logarithmic motion between said indicator and the other scale in response to movement of said contact along the surface, means for returning said indicator to a predetermined starting position, means responsive to motion in one direction of rotation of said contact for cumulatively moving said movable scale with said indicator for each corresponding dimensional movement of said contact, the last-mentioned means being adapted to maintain the new position of said movable scale relative to said indicator after said contact has been removed from the measured surface, whereby the product of the previously measured dimensions will be indicated by said indicator and movable scale.

7. A cargo volume-indicating device comprising a rollable contact adapted to be rolled over a surface of an object to be measured, a dimension-indicating scale having progressively increasing numbered divisions thereon spaced in accordance with a logarithmic function, an indicator adjacent said scale, means for moving said indicator relative to said scale in degree proportional to the logarithm of the circumferential motion of said contact, means for returning said indicator to an initial position after measurement of a linear dimension of an object, and means coupling said scale and indicator together for moving said scale with said indicator during the return movement of said indicator, whereby, by logarithmic addition, the product of successively measured dimensions of the object will be indicated on said scale by said indicator when said indicator is in its initial positon.

8. The structure of claim 7, the first-mentioned means including a cam mechanically coupled to said contact, a cam follower riding against said cam, means confining said follower to rectilinear logarithmic motion in response to motion of said cam, and means for transmitting logarithmic motion of said cam follower to said indicator.

9. The structure of claim 2, said coupling means including a cam mechanically coupled to said rollable contact device, a cam follower riding against said cam, means confining said follower to rectilinear logarithmic motion in response to motion of said cam, and means for transmitting the logarithmic motion of said follower to said dimension-indicating member during the return motion of said index marker member.

10. The structure of claim 7, the first-mentioned means including a screw having threads logarithmically spaced, follower means engaging said threads for rectilinear movement thereby, and means for transmitting the logarithmic motion of said follower means to said scale during the return motion of said indicator.

11. The structure of claim 2, said coupling means including a screw having threads logarithmically spaced, follower means engaging said threads for rectilinear movement thereby, and means for transmitting the logarithmic motion of said follower means to said dimension-indicating member during the return motion of said index-marker member.

12. The structure of claim 1, said coupling means including a cam mechanically coupled to said rollable contact device, a cam follower riding against said cam, means confining said follower to logarithmic motion in response to motion of said cam, and means for transmitting the logarithmic motion of said follower to said movable scale during the return motion of said index marker.

13. The structure of claim 1, further comprising means mounting said movable scale and index marker for rotary movement, said unidirectional coupling being a ratchet mechanism, said returning means comprising a spring coupled to said index marker, said coupling means including a cam mechanically coupled to said rollable contact device, a cam follower riding against said cam, means confining said follower to logarithmic motion in response to motion of said cam, and means for transmitting the logarithmic motion of said follower to the movable scale during the return motion of said index marker.

14. The structure of claim 1, said coupling means including a screw having threads logarithmically spaced, follower means engaging said threads for rectilinear movement thereby, and means for transmitting the logarithmic motion of said follower means to said movable scale during the return motion of said index marker.

15. The structure of claim 3, the first-mentioned means including a cam mechanically coupled to said contact, a cam follower riding against said cam, means confining said follower to logarithmic motion in response to motion of said cam, and means for transmitting motion of said follower to said movable scale during return movement of said indicator.

16. A cargo volume-indicating device comprising a rollable contact adapted to be rolled over a surface of an object to be measured, a rotatable dimension-indicating disc bearing a peripheral log scale, and coupling means including a cam mechanically coupled to said contact and to said disc, said cam having a cam surface portion shaped in accordance with a logarithmic function and having a first cam surface portion in the shape of a circular arc contiguous to an end of said logarithmic cam surface portion.

17. The structure of claim 16, further comprising a cam follower riding against said cam surface, and means for transmitting the logarithmic motion of said follower to said disc, said disc being motionless while said follower rides against said circular portion of said cam.

References Cited in the file of this patent
UNITED STATES PATENTS

| | | |
|---|---|---|
| 1,979,512 | Wasson | Nov. 6, 1934 |
| 2,110,757 | Clarke | Mar. 8, 1938 |
| 2,623,690 | Gourbeyre et al. | Dec. 30, 1952 |
| 2,646,216 | Vlajinac | July 21, 1953 |